United States Patent [19]
Child

[11] 3,825,956
[45] July 30, 1974

[54] HEART VALVE WITH TWO-PART BASE

[75] Inventor: Francis W. Child, Maple Plain, Minn.

[73] Assignee: Medical Incorporated, Minneapolis, Minn.

[22] Filed: July 13, 1972

[21] Appl. No.: 271,549

[52] U.S. Cl.................... 3/1, 3/DIG. 3, 137/527.8
[51] Int. Cl............................................. A61f 1/22
[58] Field of Search.... 3/DIG. 3, 1; 137/527, 527.4, 137/527.8

[56] References Cited
UNITED STATES PATENTS

| 460,223 | 9/1891 | Smith............................ 137/527.8 X |
| 3,099,016 | 7/1963 | Edwards................................... 3/1 |
| 3,438,394 | 4/1969 | Nakib................................... 3/1 X |
| 3,451,067 | 6/1969 | Jordan..................................... 3/1 |
| 3,476,143 | 11/1969 | Kaster................................. 3/1 X |
| 3,546,711 | 12/1970 | Bokros.................................... 3/1 |
| 3,594,824 | 7/1971 | Nakib..................................... 3/1 |

FOREIGN PATENTS OR APPLICATIONS

| 1,160,009 | 7/1969 | Great Britain.................... 3/DIG. 3 |
| 1,160,008 | 7/1969 | Great Britain.................... 3/DIG. 3 |

*Primary Examiner*—Richard A. Gaudet
*Assistant Examiner*—Ronald L. Frinks

[57] ABSTRACT

A heart valve having a free-floating pivoting disc for controlling the flow of blood. The disc is located within a passage in the base of the valve. Inwardly directed proximal and distal pivots control the pivoting movement of the disc. The pivots are offset from a diameter of the disc so that the disc pivots between its open and closed positions between its center and outer peripheral edge of the disc. The disc is held in free-floating assembled relation with the pivots and base with a curved retaining rod having a curved end projected through a central hole in the disc. The base has two joined members. The pivots are on one base member and retaining rod is on the other base member.

8 Claims, 3 Drawing Figures

PATENTED JUL 30 1974 3,825,956

HEART VALVE WITH TWO-PART BASE

BACKGROUND OF INVENTION

Heart valve prostheses are used in patients whose natural valves are damaged by congenital malformations or diseases and associated scarring and calcification. Numerous heart valve designs have been developed using either a ball, leaflet, or disc valving member. Each of these designs has certain advantages as well as deficiencies. They attempt, but do not achieve, the duplication of healthy, natural heart valves. Problems of prosthetic heart valves are largely due to the shape and operating structure of the valves and the materials used in the valves. Some of the limitations of currently used heart valves are:

1. low efficiency and high pressure gradient across the valve;
2. high structural profile;
3. localized sites of wear and fatigue;
4. chemical breakdown and absorption of water and body fluids;
5. regions of blood stagnation;
6. structures that cause turbulence, regurgitation and eddy currents in the blood flow;
7. structure that can result in formation of clot streamers; and
8. malfunction of the movable valving member.

Durability is a crucial factor in the clinical applicability of any heart valve, as a heart valve must open and close approximately 4 million times a year. It is imperative that the material used in the heart valve be immune from biochemical degradation and mechanical failure due to wear and fatigue of rubbing or flexing of the components of the valve. Biodegradation is interrelated with mechanical failure as it accelerates material fatigue and material breakdown. Rubbing and wear can accelerate the biochemical reaction, continually exposing new surfaces to corroding media.

Leaf-type valves, as disclosed by Lord in U.S. Pat. No. 2,682,057 and Servelle in British Pat. No. 1,160,008, and disc-type valves as disclosed by Wada in U.S. Pat. No. 3,445,863; Schimert et al. in U.S. Pat. No. 3,538,514 and Bokros in U.S. Pat. No. 3,546,711, have low pressure gradients and fair flow characteristics.

DeLaszlo, in U.S. Pat. No. 3,526,906, discloses prosthetic implants made from carbonaceous materials. The heart valve implant has a rigid base of carbon or graphite carrying a silicone rubber ball or a disc having legs of plastic material. Bokros, in U.S. Pat. No. 3,546,711, shows a carbon coated valve having a gate pivoted on a fixed pin. Cruz et al., in U.S. Pat. No. 3,367,364 and Kaster, in U.S. Pat. No. 3,476,143, disclose several pivoting disc heart valve designs. Bjork has described a disc-type heart valve in the *Scandinavian Journal of Thoracic and Cardiovascular Surgery* 3; 1–10, 1969.

Nakib, in U.S. Pat. No. 3,438,394, discloses in FIGS. 8 and 9 a heart valve having a toroidal valving member that has a combined linear and angular movement as it opens and closes. Jordan, in U.S. Pat. No. 3,451,067, shows a heart valve having a check linearly guided on a rod. These valves, except for the Kaster and Bjork valves, are not pivoting disc valves. The base and disc pivoting structures of these valves are not adapted to be made entirely of rigid carbon materials. Parts of either the base or the pivoting structure must be movable or flexible to permit assembly of the disc into the base. The plastic materials used in the discs are, over a period of time, susceptible to biodegradation as they tend to take up moisture and other body fluids, proteins and enzymes which may eventually deteriorate the disc, inhibiting the operation of the valve. Also, the plastic materials do not have dimensional stability when subjected to steam autoclaving for sterilization.

SUMMARY OF THE INVENTION

The invention broadly relates to a check valve for controlling the flow of fluid through a passage in a housing or ring. The invention is specifically directed to a heart valve prosthesis having a pivoting disc means movable between open and closed positions relative to a base to control the flow of blood through a passage in the base. A retaining means secured to the base has a portion extended through a central hole in the disc means to hold the disc means in free-floating relation with the base. The disc means is free to rotate about its central axis as it pivots between open and closed positions. Pivot means are located on the base offset from a diameter of the passage and are engageable with the disc for controlling the pivotal movement of the disc means offcenter from the diameter of the disc means. The pivot means include members or legs engageable with separate proximal and distal portions of the disc means during movement of the disc means. Each of the members has a curved pivot surface which allows shifting of the pivot axis of the disc toward the center of the disc during movement of the disc between its open and closed positions. The heart valve has a two-part base which can have coatings or outer skins of Pyrolite carbon. One part of the base has the pivot legs or projections for the disc. The other part of the base has a disc retaining means. The retaining means comprises a curved rod having a section projected through a center hole in the disc. The rod may be provided with a stop shoulder to limit the open position of the disc.

IN THE DRAWINGS

Figure 1:
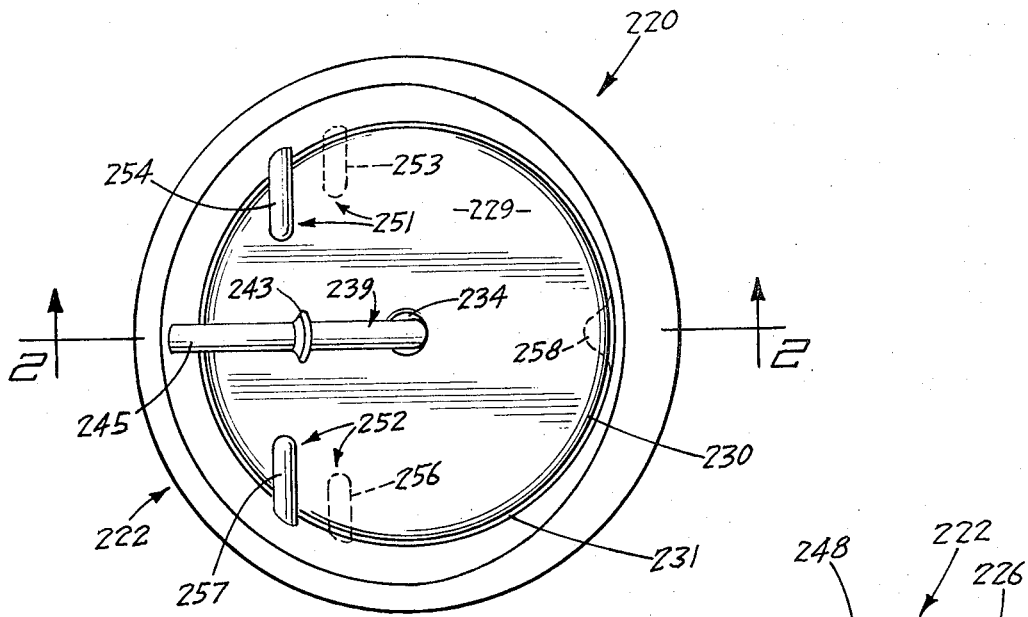
FIG. 1 is a top plan view of the heart valve.
Figure 2:
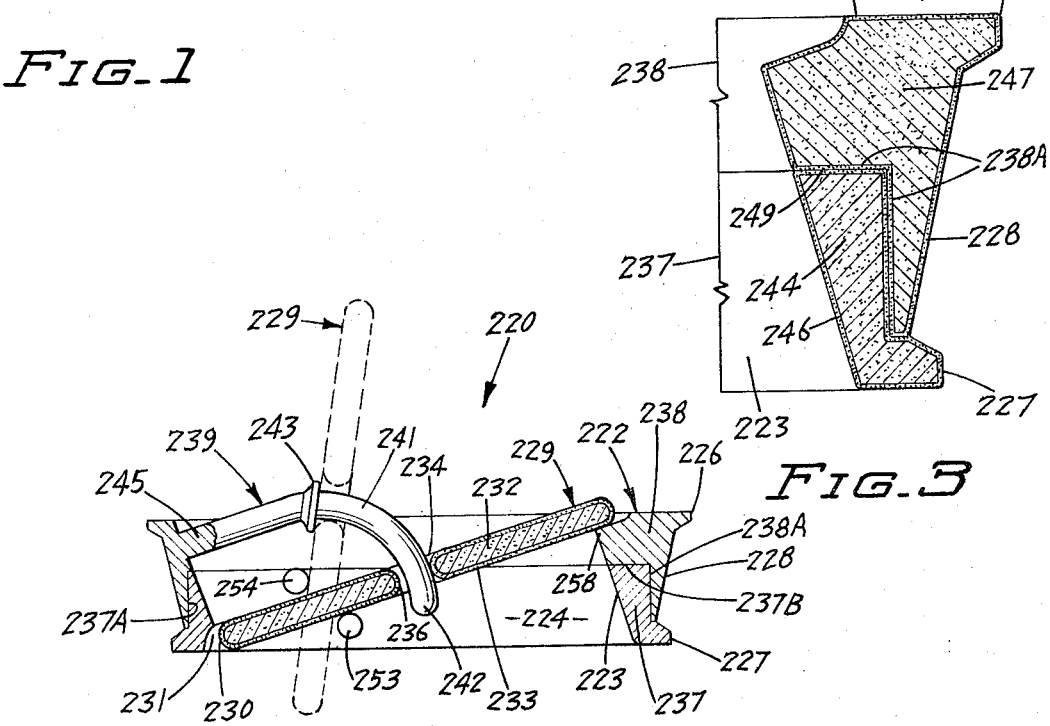
FIG. 2 is a sectional view taken along the line 2—2 of FIG. 1.

Referring to FIGS. 1 and 2, there is shown the heart valve of this invention indicated generally at 220 for controlling the flow of blood in a human heart. Valve 220 has a base or annular housing 222 and a movable valving member or disc 229. The housing 222 has an annular inner wall 223 defining a passage or opening 224 through the housing. Valving disc 229 is mounted on the housing and has a pivotal free-floating relationship relative to the housing to permit one-way flow of blood through passage 224 and restrict the flow of blood through passage 224 in the opposite direction.

Extended outwardly from the upper, or distal, side of the housing 222 is an annular flange 226. The lower or proximal side of the housing 222 has a similar outwardly directed flange 227. A cylindrical outer circumferential housing wall 228 located between flanges 226 and 227 accommodates an annular suturing member or sewing ring (not shown).

The valving member, or occluder, 229 is a generally flat valving disc having a circumferentially uninterrupted outer peripheral edge 230. Edge 230 cooperates with portions of the inner wall 223 to restrict reverse flow of blood through the passage 224 when the disc 229 is in the closed positions, as shown in full lines in FIG. 2. The outer peripheral edge 230 of the disc 229 is spaced slightly inwardly from the inner wall 223 by an annular space 231. The space 231 is of a size to permit limited reverse flow of blood through passage 224 when the disc is in the closed position.

Disc 229 has a core or substrate 232 that is entirely covered with a coating or skin 233. Skin 233 is a hard, wear-resistant material that is biologically inert. Preferably, skin 233 is a silicone alloyed Pyrolite carbon material. The skin can have a plurality of layers. Skin 233 is attached to the outer surface of substrate 232 with a bond in the process of applying the skin to the substrate. Substrate 232 can be any rigid material, as metal, plastic, carbon or the like. The substrate can contain a hollow chamber to reduce its weight.

Disc 229 has a circular hole 234 in the center portion thereof. An inner annular wall 236 surrounds the hole 234. The cross sectional shape of wall 236 is a semicircular configuration whereby the wall 236 does not have any abrupt projections or edges which can interfere with the flow of blood through hole 234.

Disc 229 is held in free-floating relationship with the base 222 because the disc has limited axial movement, limited lateral movement, is free to rotate 360° about its central axis and is angularly movable between its open and closed positions. Disc 229 is maintained in a free-floating relationship with the housing 222 with a retainer indicated generally at 239. Retainer 239 is an elongated radially inwardly projected rod having downwardly curved outer section 241 terminating in a generally hemispherical end 242. Section 241 has an arcuate shape that generally follows the path of the angular movement of the inner wall 236 of the disc 229 as the disc pivots between its open and closed positions. Section 241 has a circular cross section and a diameter slightly smaller than the diameter of hole 234, thereby allowing a small amount of blood to flow through hole 234 and providing the disc with limited lateral movement.

Figure 3:
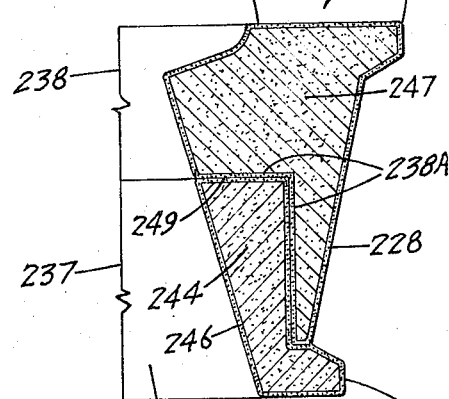
FIG. 3 is an enlarged sectional view of the two-part base of the heart valve having carbon outer skins.

Housing 222 has two parts or sections 237 and 238 that fit onto each other and are secured together. The first, or proximal section 237 includes the annular flange 227 and has a cylindrical outside wall 237A and a transverse top wall 237B. The second, or distal, section 238 includes annular flange 226 and outer wall 228. Section 238 has an annular groove or counter bore 238A of a shape and size to accommodate the outside wall 237A and wall 237B of the first section. Inner wall 223 of the housing extends to both sections 237 and 238. As shown in FIGS. 2 and 3, section 238 is telescoped over section 237 to form the housing 222. Suitable fasteners, as pins, keys and bonding cement or adhesive materials, can be used to attach sections 237 and 238 together.

The midportion of the retainer 239 has an enlarged annular member or collar 243 which functions as a stop to limit the open position of disc 229. As shown in FIG. 2, when disc 229 is in its maximum open position, it engages the collar 243.

Referring to FIG. 3, housing section 237 has a substrate or core 244 and coating or skin 246. Housing section 238 has a substrate or core 247 covered with skin 248. Skins 246 and 248 are preferably of Pyrolite carbon material. The outer end 245 of retainer 239 is part of or integral with housing 238. Retainer 239 and housing section 238 are made from one piece of material, as metal, carbon and the like, thereby eliminating added fastening structure, as welds, to attach the retainer to the housing. The engaging surfaces 249 of the sections 237 and 238 are bonded together whereby the housing 222, the retainer 239 and the pivot structures for the disc can have a Pyrolite carbon coating.

The pivotal movement of disc 229 is controlled by pivot means and the retainer 239 which provide the disc with an off center pivoting movement. Disc 229 pivots between its outer edge and its diameter to an open position, shown in broken lines in FIG. 2, and a closed position, shown in full lines. The pivot means comprise a first pair of pivots indicated generally at 252. The first pair of pivots 251, as shown in FIG. 1, has a proximal pivot 253 extended over a portion of the proximal side of the disc 229 and a distal pivot 254 extended adjacent the distal side of the disc 229. Pivots 253 and 254 are integral with the base section 237 and extend into passage 224. The pivots are projections, elements or legs that are spaced from each other a distance slightly greater than the thickness of the disc 229. The second pair of pivots 252 comprise a proximal pivot 256 and a distal pivot 257 circumferentially spaced from the first pair of pivots and extended into opening 224. Pivots 256 and 257 are integral with the base section 237 and are projections, elements or legs spaced from each other and located on opposite sides of the disc 229.

As shown in FIG. 1, pivots 253,254 and 256,257 extend generally toward each other and have generally circular fulcrum surfaces engageable with the outer surfaces of the disc 229 to control the pivoting action of the disc between its open and closed positions. The pairs of pivots 251 and 252 are located off-center or in eccentric locations relative to the diameter of the passage 224 whereby the disc pivots about an off-center or eccentric axis as it opens and closes. The pivotal axis of disc 229 is generally a chord of the passage 224 which shifts relative to the diameter of the passage as the disc opens and closes. The chord pivotal axis of the disc remains generally parallel to the diameter axis as it opens and closes, whereby the disc has relatively smooth opening and closing movements.

Distal section 238 of the housing 222 has an inwardly directed abutment or stop 258 located generally diametrically opposite the radial retainer 239. Stop 258 projects inwardly into the passage 224 and has an upper face engageable with a portion of the disc 229 when the disc is in the closed position. As shown in FIG. 2, when disc 229 is in the closed position, it is inclined relative to the longitudinal axis of passage 224. Preferably, the inclination is 18° with respect to the horizontal. It is understood that other angles of inclination can be used for disc 229 when it is in the closed position. The disc 229 rests on proximal pivots 253 and 256 and stop 258 when it is in the closed position. Disc 229 angularly moves from the closed position to the open position in response to an increase in the pressure of blood on the proximal side of the disc. When fully open, disc 229 is at a slight angle, preferably 75°–80°, with respect to the horizontal or transverse axis of the passage and is located laterally of the central longitudinal axis of the passage 224. This permits central flow of blood through passage 224 while at the same time allows the blood to flow on opposite sides of disc 229.

In use, with disc 229 in the closed position, it will initially move axially off the pivots 253 and 256 and stop 258 until the upper surface of the disc contacts the distal pivots 254 and 257. The disc will then move around the pivots 254 and 257 about a chord-like or off-center axis. The disc will generally follow the curvature of the retainer 241 until the disc is in the full open position. At that time, the disc will engage the collar 243 which limits the open position of the disc to a slight incline relative to the axis of the passage 224. Disc 229 is free to rotate 360° about its center axis as it moves to the open position.

A reduction in pressure of the blood on the proximal side of the disc 229 will cause the disc to initially drop a slight amount and move about distal pivots 253 and 256 to the closed position. As disc 229 closes, the pivotal chord-like axis moves along the fulcrum surfaces of the pivots 253 and 256 until the disc is closed. During the opening and closing episodes of the disc, the chord-like pivotal axis of the disc remains parallel to and is substantially unaltered with respect to a diameter of the disc or any other line that is parallel to the diameter of the disc. The chord-like pivotal axis shifts a slight amount toward the diameter of the passage 224 as the disc closes. Disc 229 is free to rotate 360° about its center axis as it moves to the closed position.

The housing 222, being made of two sections 237 and 238, permits the entire valve to have a Pyrolite carbon coating. Section 237 contains the pairs of pivots 251 and 252. Section 238 includes the retainer 239. It can be seen that the entire valve can be assembled without bending or joining any of the housing, retainer or disc, thereby permitting the entire valve to have Pyrolite carbon coating.

The invention has been shown and described with respect to preferred embodiment of the heart valve. Changes, modifications, and substitutions can be made by those skilled in the art without departing from the spirit of the invention.

The embodiments of the invention in which an exclusive property or privilege is claimed are defined as follows:

1. A heart valve for controlling the flow of blood comprising: base means having inner wall means providing a passage for the flow of blood; valving disc means movably associated with the base means for movement to an open position to allow flow of blood through said passage in one direction and to a closed position to restrict the flow of blood in the opposite direction through said passage, said disc means being free to rotate about its central axis as the disc means moves between its open and closed positions, said disc means having a hole through the central portion thereof and an annular uninterrupted outer peripheral edge; retaining means secured to the base means for holding the disc means in movable assembled relation with the base means, said retaining means including a radially inwardly directed rod having an inward end portion curved into the passage and extended through the hole in the disc means, said rod having a circular cross section and a diameter slightly smaller than the diameter of the hole thereby allowing blood to flow through the hole and permit limited lateral movement of the disc means relative to the rod, outwardly directed stop means on a portion of the rod intermediate the ends of the rod engaged by the disc means when the disc means is in the full open position, and pivot means on the base means offset from a diameter of the passage and engageable with the disc means for controlling the pivotal movement of the disc means off-center from a diameter of the disc means, said base means having a first annular part and a second annular part having an annular groove accommodating an annular portion of the first part, said first part and second part of the base means having continuous inner annular wall means providing the passage through the base means, and means securing the first part to the second part, said rod being attached to the second part and said pivot means being attached to the first part.

2. The heart valve of claim 1 wherein: said disc means has an outer skin of Pyrolite carbon.

3. The heart valve of claim 2 wherein: said base means and pivot means have outer skins of Pyrolite carbon.

4. The heart valve of claim 1 wherein: said outer peripheral edge of said disc means is spaced from the inner wall of the base means when the disc means is in the closed position whereby limited reverse flow of blood is permitted through said passage.

5. The heart valve of claim 1 wherein: said pivot means cooperate with the disc means to hold the disc means in an inclined position relative to the transverse plane of the passage when the disc means is in the closed position.

6. The heart valve of claim 1 wherein: said retaining means comprises a single rod having a base portion secured to the second part of the base means and a curved radially inwardly directed portion having an end projected through the hole in the disc means, a portion of said rod having a curvature that generally follows the pivotal path of the center hole in the disc means.

7. The heart valve of claim 1 wherein: said stop means is a collar on said rod.

8. The heart valve of claim 1 wherein: said base means, retaining means, pivot means and disc means have outer skins of Pyrolite carbon.

* * * * *